United States Patent Office 3,221,921
Patented Dec. 7, 1965

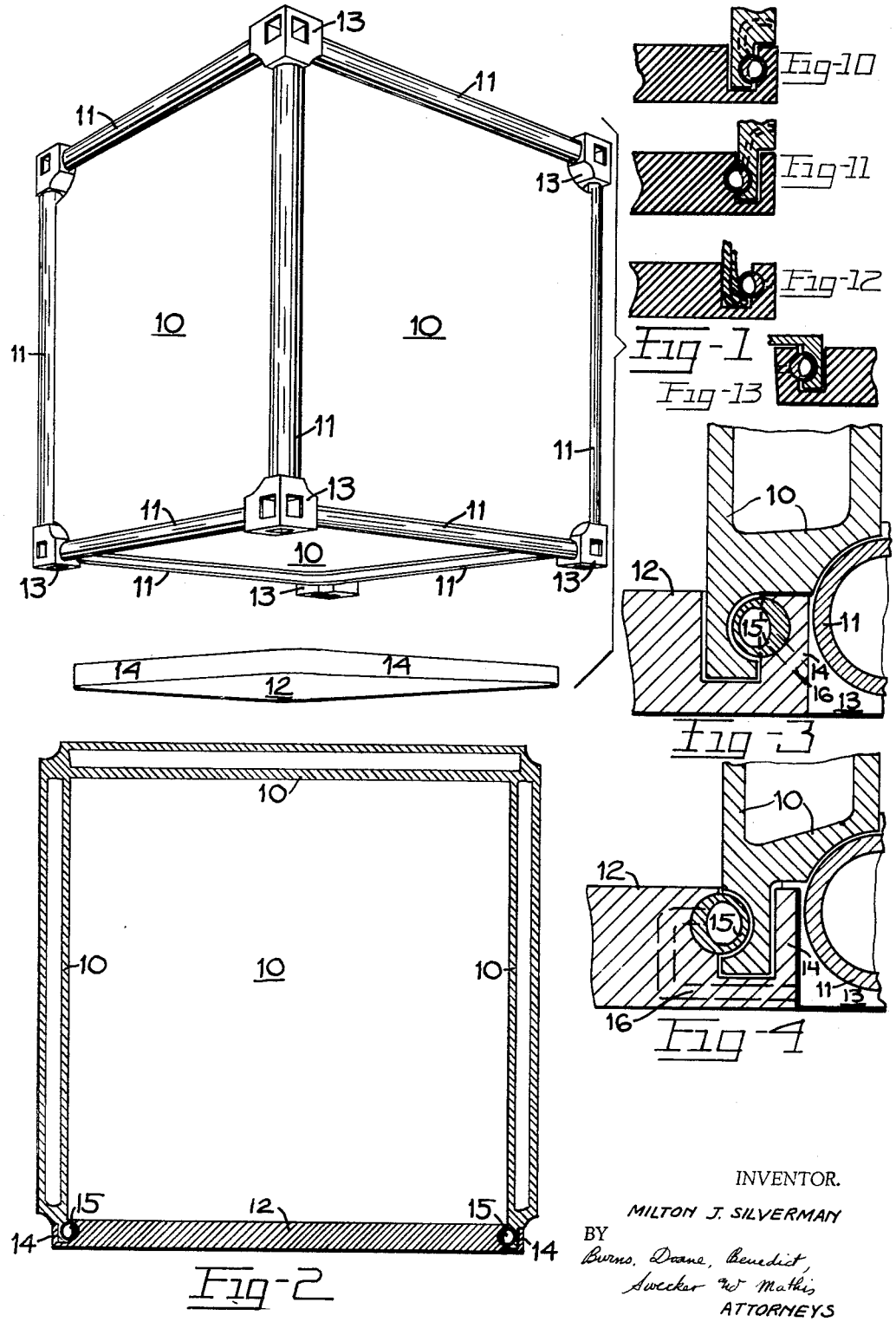

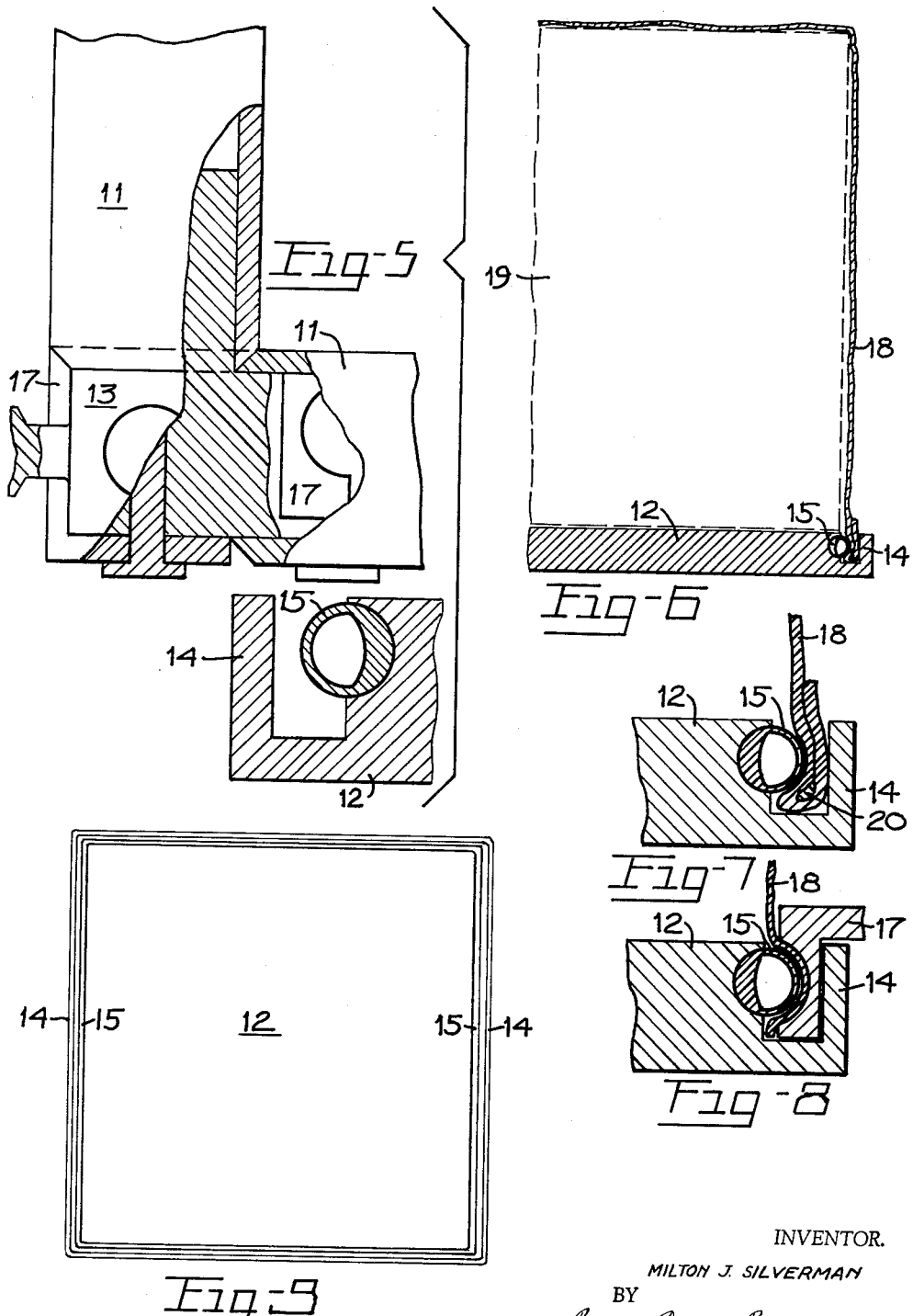

3,221,921
DEVICES FOR HOLDING CARGO
Milton J. Silverman, 9623 Grossmont Blvd.,
Grossmont, Calif.
Continuation of abandoned application Ser. No. 66,579,
Nov. 1, 1960. This application Dec. 8, 1961, Ser. No.
157,958
4 Claims. (Cl. 220—46)

This is a continuation application of my application Serial Number 66,579, dated Nov. 1, 1960, now abandoned.

My invention relates in general to materials handling devices and more particularly to devices for holding cargo in shipment.

An object of my invention is the provision of a cargo container for encasing cargo and for moving said cargo by floating the cargo container on the waters of the world and propelling it by external means; typical included objects include the following: provision of a means of transferring cargo by water without the use of cargo boats or barges; provision of a means for a relatively small boat, of almost any type, to move relatively large quantities of cargo by towing or pushing the said cargo containers; provision of a means for unloading cargo from ships while such ships are at positions where such unloading is impossible or impracticable using present means as for example when a ship is too large to enter a port for which it might otherwise carry cargo, in which case, using the said cargo containers, the ship, lying to or at anchor off the port, lowers cargo encased in the said cargo containers into the water where the cargo containers can be taken into tow by a boat and propelled to the port where they can be lifted out of the water for further transfer; provision of a means for ships to unload cargo at ports without entering such ports and thus saving ship transit time, pilotage fees, docking and ship handling fees, and eliminating the additional hazard which is inherent in the navigation of ships in restricted waters, thus making it economically feasible for ships to deliver cargo to ports which, using present methods, it is not otherwise possible to service as, for example, when a shipment for a port is so small as to make it otherwise economically unwise to undertake the carrying of it; provision of a means to unload cargo in cases where, even if a cargo boat or barge were available, such unloading would be impossible or impracticable as, for example, when weather conditions are such that there is a large relative movement between a ship and an alongside cargo boat or barge making it impossible, or unsafe, to unload cargo because of the difficulty in placing the cargo into the boat or onto the barge due to the relative motion, such motion also giving rise to the possibility of damage due to sharp contact between the ship and the boat or barge, such weather not normally precluding the lowering of the said cargo containers into the water and the towing or pushing of the containers to the port or beach, the contact of the said containers with the water being much smaller, in the sense of shock, as compared to the contact of cargo with a cargo boat or barge; provision of a means of servicing coastal ports or points not having cargo boats or barges by utilizing almost any type of small boat which might be available as a towing or pushing boat for propelling the said cargo containers, or, in certain special cases, by using a dragline or other external propelling means; and provision of a suitable watertight container for use with my "Watercraft for Carrying Floatable Cargo" disclosed in my copending application Serial Number 124,555 dated July 17, 1961, all providing a means for opening up a larger part of the world to service by water shipment.

Another object of my invention is the provision of a cargo container which provides a measure of protection against sinking of ships which carry such cargo containers; an included object is a reduction in ship insurance rates.

Another object of my invention is the provision of a cargo container which will maintain the contents free from harmful effects normally caused by water.

Another object of my invention is the provision of a cargo container which can be used for holding bulk cargo as well as for holding other types of cargo.

Another object of my invention is the provision of a cargo container closure panel and materials handling framework panel which can be easily and quickly locked into place as a closure panel for a cargo container or as a cargo holding panel for a materials handling framework, and easily and quickly unlocked from place when so locked.

Another object of my invention is the provision of a collapsible cargo container; an included object is the minimization of shiping charges for empty cargo containers.

Other objects and a fuller understanding of the invention may be had by referring to the following description and claims, taken in conjunction with the accompanying drawings in which:

FIGURE 1 is a perspective view of the cargo container being held by a suitable materials handling framework;

FIGURE 2 is a vertical cross-sectional view of a cargo container without the materials handling framework showing the watertight closure panel locked to the hollow airtight body section; since the cargo container can be used without the materials handling framework, the framework is not shown in this drawing;

FIGURE 3 is a fragmentary vertical cross-sectional view showing the closure panel of the cargo container locked to the body of the shiping container;

FIGURE 4 is a fragmentary vertical cross-sectional view showing the preferred embodiment of the closure panel of the cargo container locked to the body of the shipping container;

FIGURE 5 is a fragmentary vertical cross-sectional view of the preferred embodiment of the materials handling framework panel in position below another embodiment of the materials handling framework;

FIGURE 6 is a fragmentary vertical cross-sectional view of the collapsible cargo container;

FIGURE 7 is a fragmentary vertical cross-sectional view of the flexible hollow section of a collapsible cargo container locked to the closure panel;

FIGURE 8 shows a fragmentary vertical cross-sectional view of the flexible hollow section of a collapsible cargo container locked to the closure panel and to the materials handling framework.

FIGURE 9 is a top plan view of the panel which is to be used in two main functions and which is referred to, according to the funtion performed, as either the closure panel or as the materials handling framework panel;

FIGURE 10 shows a fragmentary vertical cross-sectional view of the flexible hollow section of a collapsible cargo container locked to another embodiment of the closure panel and to the materials handling framework;

FIGURES 11 and 12 show a fragmentary vertical cross-sectional view of other embodiments of the closure panel locked to other embodiments of the body; and FIGURE 13 shows a fragmentary vertical cross-section showing the closure panel locked to the materials handling framework adapter.

Referring more particularly to the drawings, in FIGURE 1 a hollow airtight body 10, with an open face opening downward, and having grooves on the edges, is shown being held by a suitable materials handling framework, the pipe members 11 of said framework being identified in the drawing. A watertight closure panel 12 is shown below the open face of the body. The materials handling framework shown can be assembled in its holding position, encaging the body 10, by screwing the pipemembers 11 into the corner fittings 13; the pipe members 11 thus rest in the grooves located on the edges of the body 10 and hold the body 10 encaged. The materials handling framework provides a suitable means of handling the cargo containers in that the corner fittings 13 are hollowed out, as shown in FIGURE 1, to provide three bars at the outside edges of each fitting which can be engaged by wires, ropes, hooks, and similar handling means; the materials handling framework and the corner fittings are disclosed in my co-pending application Serial Number 124,710 dated July 17, 1961. In FIGURE 2 the watertight closure panel 12 is shown mated as a closure to the open face of the body 10. Inasmuch as the cargo container can be used without a materials handling framework, such a framework is not shown in FIGURE 2. Holding lips 14 on the periphery of the watertight closure panel 12 engage the edges of the open face of the body 10 when the watertight closure panel 12 is mated, as shown, to the body 10. An air-expanding tube 15 is shown in an expanded position; this tube encircles the periphery of the watertight closure panel 12, being held in an annular recess which is located on the periphery as shown. The watertight closure panel 12 is locked in position, as shown, closing the open face of the body 10, by the air-expanding tube 15 which, when expanded as shown, engages an annular groove located on the opposing lower edge of the body 10. The holding lips 14 prevent substantial lateral movement of the edges of the open face away from the tube. The air-expanding tube 15 thus acts as a means of locking and unlocking the panel 12 and the body 10 one from the other and also acts to provide a means of sealing the junction between the two parts, against the passage of water therethrough, by pressing against both as shown; pressure within the air-expanding tube 15 causes the tube to conform to such minor variations as might occur in the positions of the edges of the open face of the body 10 relative to the edges of the closure panel 12, such variations not thereby breaking the seal. Although the tube 15 is referred to hereinbefore as an air-expanding tube, it is to be understood that other pressure means, such as gas or liquids, can also be used.

The manner in which water is prevented from entry into the container is described in more detail as follows: assuming the container is floated in a body of water, the watertight closure panel 12 is watertight and thereby prevents passage of water therethrough, the expanded air-expanding tube 15 prevents passage of water through the junction between the watertight closure panel 12 and the body 10, and the body 10 is airtight and therefore watertight and prevents passage of water therethrough. The purpose of making the body 10 airtight is described as follows: if the air-expanding tube failed to make a completely watertight seal, as for example when an unnoticed piece of debris is caught between the tube 15 and the walls of the body 10 during the locking process, the pressure of the air entrapped within the body 10 will, when the cargo container is in the substantially vertical position shown, prevent entry of water. Also it can be seen that if the watertight closure panel 12 for some other reason loses its watertightness the pressure, normally atmospheric pressure, of the air entrapped within the body 10 will likewise prevent substantial entry of water into the shipping container. It can be seen that when such containers are carried by a ship, protection is afforded against damage of the encased cargo by water and fumes, and protection would be given also against sinking of the ship, which might be occasioned by opening of the hull, by reason of the added compartmentation afforded by such containers, the air-entrapment feature giving protection even in the case of damaged containers by preventing water entry substantially above the point of the uppermost point of rupture of the container.

It is to be understood that by virtue of being airtight, the body is also watertight, and that loss of airtightness, insofar as such loss does not negate watertightness, will not negate the watertightness of the container but would, in the sense described, negate the air-entrapment feature; thus this disclosure includes also a body impervious to the passage of water therethrough.

As shown in FIGURE 3, in which, as in FIGURE 1, the materials handling framework members are again shown, the watertight closure panel 12 can be unlocked from the body 10 by opening the valve 16; the air inside the tube escapes through this valve and the air-expanding tube 15 relaxes, from the position shown to the position shown by the broken lines. The watertight closure panel 12 is then free to drop clear, the lock and seal having been broken by the relaxation of the air-expanding tube 15; the body 10 is thus free to be lifted clear to expose encased cargo to ease of access.

To load cargo, the watertight closure panel 12 is separated from the body 10, the air-expanding tube 15 being in the relaxed position, and cargo is placed upon the watertight closure panel 12; the combined weight of container and cargo is kept a sufficient amount less than the weight of water to be displaced, when the container is to be used in a floating application for moving cargo, that the container and the encased cargo will float. The body 10 is then lowered by suitable means to the mating closure position with the watertight closure panel 12, thus covering the cargo, and then air (or gas or liquid) is injected through the open valve 16 to expand the air-expanding tube 15 and then the valve 15 is closed to lock the air within the tube 15; the cargo container is thus locked in a closed position.

In connection with the locking and sealing means hereinbefore described, air-expanding tube means are known in the art and have been disclosed as a means to lock and seal lids of cannisters; such means are not however of use in the present invention because their design is such that they cannot support the weights, of the magnitude expected in the cargo container application, imposed on the customary square or rectangular closure panel of the sizes found in such use; in the present invention the holding lip 14 prevents substantial lateral movement of the body away from the air-expanding tube which would cause the lock and seal to fail, thus, in combination with the tube 15 and the associated grooves, providing an effective locking and sealing means.

The watertight closure panel can be used in identical form as a materials handling framework panel as shown in FIGURE 5. The same framework previously described is a suitable framework for use in this instance in combination with the panel 12, and when the panel 12 is mated and locked to the materials handling framework the whole can be used for lifting cargo, such as an automobile, which may be placed upon the said materials handling framework panel 12. FIGURE 5 shows the materials handling framework panel 12 in position below elements of another embodiment of the materials handling framework. Adapter lower rail members 17 replace the lower pipe members of the framework; they include a grooved surface, as shown, which is engageable to the air-expanding tube 15. The method of locking the materials handling framework panel 12 to the materials handling framework, and unlocking it therefrom, is similar to that previously described, the expansion of the air-expanding tube effecting the locking, and the relaxation effecting the unlocking. It can be seen that although the panel 12 has been described as being watertight it need not be watertight in such applications as this and, further, that it need not be a solid panel.

FIGURE 6 shows a fragmentary vertical cross-sectional view of a flexible section 18, hollow in shape when extended, and having an open face, covering cargo 19, shown by broken line, which has been placed on the closure panel 12. As shown in FIGURE 7, the flexible section 18, made of suitable flexible material such as a synthetic plastic, is beaded at the edges of the open face by suitable means, such as the cord 20, and is locked and sealed by the action of the air-expanding tube 15, as shown; the flexible section 18 can be released by unlocking the air valve of the tube 15. It is apparent that watertight material, if chosen for the flexible section 18, can make the flexible section 18 watertight and also that choice of material can make it airtight as desired in which latter case the air-entrapment feature previously mentioned in connection with floating applications is applicable in those cases where provision is made for holding out the sides and top of the flexible section 18 to prevent inward collapse which might otherwise be occasioned by the pressure of the water outside; in FIGURE 6 it is seen that boxed cargo 19 acts to thus hold out the sides; it is contemplated, however, that such a collapsible container would normally find usage in nonfloating applications.

A materials handling framework similar to that previously described can be used in conjunction with the flexible section 18 and the closure panel 12, and framework members 11 can be engaged by such means as clips or sleeves, secured to the flexible section 18, as a means of holding the flexible section 18 in a substantially fully extended position, thus providing for convenience in loading and handling the cargo container. It is apparent that a number of other suitable means can be devised to thus hold the flexible section 18 in an extended position. Stiffness can be added to the flexible section 18, as would oftentimes be desired, by such means as battens inserted into pockets in the material or by such means as locking compressed air or gas between the walls of the double wall type flexible section. When empty the container thus described can be collapsed into a relatively small package.

It has been mentioned that it is not necessary in all cases to use a materials handling framework for handling the cargo container, and FIGURE 2 shows the cargo container without a materials handling framework. In those cases where such frameworks are not used, as for example when they are not available for use or for some reason it is not desired to use them, it is normally desirable that a means of attachment to the cargo container be included to provide a means of attaching wires, ropes, hooks, and similar handling means. Such means can be provided in many ways, a typical means being the attachment of loops or padeyes to the cargo container.

Although the air-expanding tube 15 acts as a locking means and, as described, a sealing means, it is apparent that sealing means are not required in all cases; as previously described, for example, pressure of air entrapped within the body 10 normally prevents water from entering the container. It is further apparent that many means can be devised for locking the panel 12 to the body 10 or 18 or to the framework members. It is also apparent that the holding lips 14 hereinbefore described represent only one of the ways in which the edges of the hollow section 10 can be held from lateral movement away from the edges of the panel 12. It is apparent that my invention is not limited to the specific illustrations or descriptions given hereinbefore by way of example, but is susceptible to various modifications and changes, all of which come within the scope of the following claims:

I claim:

1. A cargo container comprising a container having an opening at one end thereof, said container comprising sidewall portions adjacent said opening, closure means for closing said opening, said closure means comprising a panel having a groove remote from the lateral edges thereof, said groove defined by opposite faces and a bottom portion, one of said faces having a recess therein, said side wall portions including end portions having a recess formed therein cooperating with said recess in said groove, said end portions received in said groove between side opposite faces, deflatable gasket means positioned in said recesses for locking said panel to said container and for sealing said opening, at least a portion of said end portions being constructed of rigid material, said end portions abutting said gasket means and releasably fixed between gasket means and said bottom portions of said groove, and means for deflating said gasket means to thereby release said end portions and unlock said panel from said container.

2. A cargo container according to claim 1 wherein said container is constructed of flexible, collapsible material.

3. A cargo container according to claim 1 wherein said container is constructed of rigid material and said recess in one of said opposite faces of said groove and in said end portion is provided on an inside face of said opposite faces and said end portion.

4. A cargo container according to claim 1 wherein said container is constructed of rigid material and said recess in one of said opposite faces of said groove and in said end portion is provided on an outside face of said opposite faces and said end portion.

References Cited by the Examiner
UNITED STATES PATENTS

| | | | |
|---|---|---|---|
| 658,588 | 9/1900 | Reynolds et al. | 220—46 |
| 2,360,276 | 10/1944 | Redmond. | |
| 2,690,854 | 10/1954 | Kaye | 220—46 |
| 2,762,551 | 9/1956 | Fallert | 206—60 |
| 2,919,826 | 1/1960 | Richter | 220—1.5 |
| 2,943,760 | 7/1960 | Hamilton | 220—81 |

THERON E. CONDON, *Primary Examiner.*

EARLE J. DRUMMOND, *Examiner.*